Patented May 25, 1937

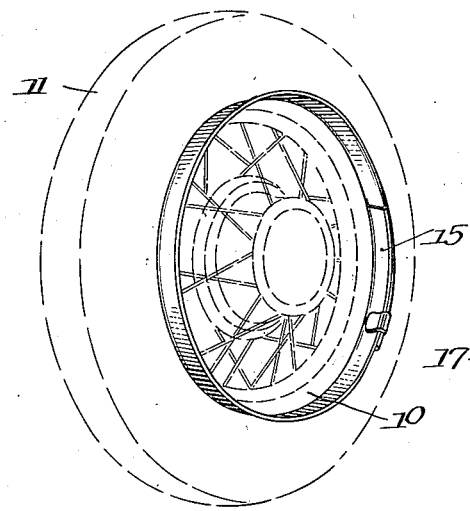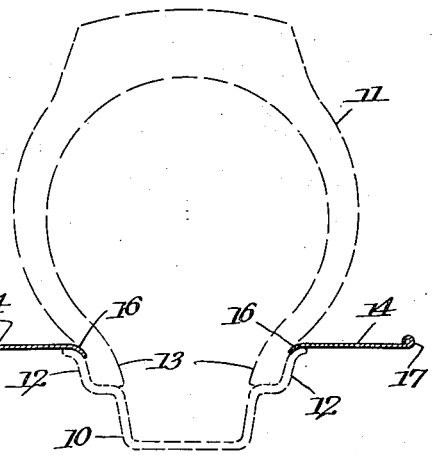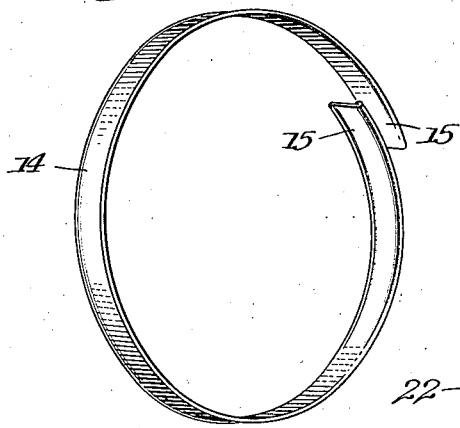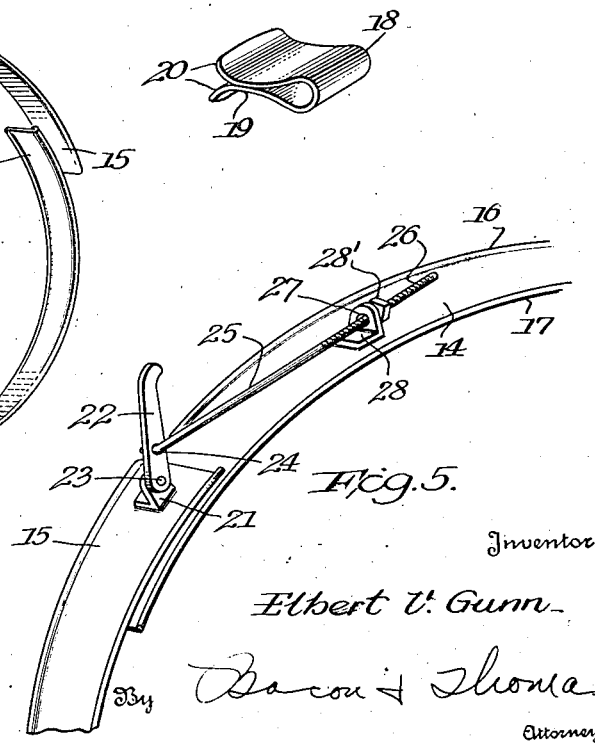

2,081,666

UNITED STATES PATENT OFFICE 2,081,666

PAINT SPRAY MASKING DEVICE FOR AUTOMOBILE WHEEL AND TIRE ASSEMBLIES

Elbert V. Gunn, Tulsa, Okla.

Application July 29, 1936, Serial No. 93,302

8 Claims. (Cl. 91—65)

This invention relates to new and useful improvements in paint spray masking device for automobile wheel and tire assemblies.

In the refinishing of automobile wheels, there are three different methods now in common use. The first method is to remove the wheels from the vehicle and then remove the tires from the wheels. The wheel, of course, then may be conditioned to receive a fresh coat of paint without danger of applying paint to the tire which belongs on the wheel. This procedure necessarily involves a considerable amount of time in disassembling and re-assembling the tires on the wheels of an automobile.

A second method which is commonly used consists of leaving the tire mounted on the wheel and, prior to applying paint by means of a spray gun on the wheel, applying a paint masking compound to the tire. This compound consists of a mixture of whiting, glycerine, etc. and must be applied with a brush to the portions of the tire casing to be protected. The application of this paint masking compound to the tire is difficult and tedious because the workmen must be careful to paint as close to the rim of the wheel as possible and yet not get any of the masking compound on any portion of the wheel. After the wheel has been spray-painted, it is a very hard job to scrape and wash the masking compound from the pores, crevices, checks, raised letters, etc. which form the surface of the tire. Furthermore, this spray compound has a tendency to remain moist and is messy and troublesome for the workmen in handling the wheel during the spraying operation.

The third commonly practiced method of repainting automobile wheels consists of washing the tire immediately after the paint spraying operation is completed with a liquid paint thinner or solvent. This method is far from being satisfactory, inasmuch as it is difficult to wash the paint from the tire right up to the edge of the rim and yet not wipe off some of the paint from the rim. The workman usually has to stop in the middle of painting wheels after each wheel has been sprayed and this usually results in the spraying equipment being left in operation while the tire is being washed. It, furthermore, is almost impossible to accomplish the tire washing operation without getting dirt from the tire onto the freshly painted wheel. Also, the tire has to be washed after every fresh coat is applied to a wheel.

There is at this time considerable activity in painting tires to enhance their appearance. Of course, to repaint a tire while mounted on a wheel, the wheel has to be protected by one of the aforementioned methods.

It, further, is a primary object of this invention to provide a masking device which may be applied to the periphery of a wheel rim, with a tire and tube mounted on the rim, for protecting either the tire or the wheel while the remainder of said members is being painted.

A further object of the invention is to provide a paint spray masking device which may be applied to automobile wheels and tire assemblies of different sizes and secured against unintentional removal to permit paint to be sprayed on the wheel or tire without damage to the member not being painted.

Other objects and advantages of the invention will be apparent during the course of the following description:—

In the accompanying drawing forming a part of this specification, and in which like numerals are employed to designate like parts throughout the same:—

Figure 1 is a perspective view of a paint spray masking device, shown in full lines, operatively associated with an automobile wheel and tire, illustrated in dash lines, Figure 2 is a radial sectional view of an automobile wheel rim and tire, shown in dash lines, with paint spray masking devices embodying this invention applied to the opposite sides thereof, Figure 3 is a perspective view of a split band which constitutes the paint spray masking device of this invention, Figure 4 is a perspective view of a form of clamping device which may be used for connecting the overlapping ends of the split band, disclosed in detail in Fig. 3 for the purpose of retaining the band in position upon the rim of an automobile wheel, and Figure 5 is a detail perspective view of a modified form of split band securing means.

In the drawing, wherein for the purpose of illustration is shown a preferred embodiment of this invention, and referring particularly to Figures 1 to 4 inclusive, the reference character 10 designates the rim portion of an automobile wheel which has mounted thereon a tire casing 11. In Figure 2, the wheel rim is illustrated as being of conventional form and as including flanged peripheral portions 12 which function to receive and confine the bead portions 13 of a tire casing.

The masking device of this invention consists of a split metallic band 14 which, preferably, is curved on an arc of less radius than the radii of the wheels with which this band is to be employed. The band, preferably, is to be formed of a length greater than the circumference of the wheels so that, when in use, the ends 15 of the band will be arranged in overlapped relation, as clearly illustrated in Figure 1. Figures 2 and 3 clearly illustrate the band 14 as having formed on one circumferential edge a radially, inwardly curved flange 16 which is shaped to snugly fit between the inner surface of the edge of the flange 12 of a wheel rim 10. Figure 2 clearly illustrates the manner in which the curved flange 16 engages the periphery of the wheel rim. This curved flange 16 is intended to be forced inwardly between the rim flange and the adjacent wall of the tire casing 11. The remaining circumferential edge of the split band 14 is intended to be provided with a rolled, reinforcing bead 17.

In Figures 1 and 4, a form of clamping device for connecting the overlapped ends 15 of the band 14 is illustrated. This fastening device consists of a substantially U-shaped spring clip 18. The opposite sides or branches of this clip are brought together intermediate their lengths, or at the points 19 to effect a tight clamping action of the overlapped ends 15 of the band 14. The extremities 20 of the clip 18 are flared outwardly to assist in ready application of the clip to the overlapped ends of the band.

If the band 14 is made of sufficiently heavy gauge and is curved on an arc of less radius than the radius of the wheel rim on which the band is applied, no securing means need be employed for the overlapped ends of the band. Thinner gauge material may, however, be used, if the clamp of Figure 4 or any other equivalent device is employed for connecting the overlapped ends of the band. It will be appreciated that many other forms of clamping devices than that illustrated may be used for this purpose.

In Figure 5, there is illustrated a form of connecting means for the overlapped ends 15 of a band. This form of clamping device is of a character which will place the split band under circumferential compression for tightly clamping the same to the periphery of a wheel rim. This clamping device consists of an angular lug 21 which is fastened in any suitable manner to one end of the split band. A lever 22 is pivoted at 23 to the upstanding arm of the lug 21. Pivotally connected, as at 24, to the lever 22 is one end of a rod 25. The remaining end 26 of this rod is screw-threaded and inserted through the relatively large aperture 27 of the upstanding branch of a second lug 28 which is suitably secured to the remaining end portion of the band. A lock nut 28 is adjustably threaded on the end 26 of the rod 25 to lengthen or shorten the active portion of the rod to adapt the band to wheel rims of different sizes. It will be appreciated than when the band of Figure 5 is applied to the periphery of a wheel rim and the lever 22 moved about its pivot 23 into a position with the extremity of the lever engaging the outer surface of the band and on which the lug 21 is mounted, the pivotal connection between the lever 22 and the rod 25 will be placed inwardly of the pivot point 23 for the lever. This movement of the lever, therefore, places the band under circumferential compression and locks the lever in its pivoted position.

It is to be understood that the forms of this invention herewith shown and described are to be taken as preferred examples of the same and that various changes in the shape, size and arrangements of parts may be resorted to without departing from the spirit of the invention or the scope of the sub-joined claims.

Having thus described the invention, I claim:—

1. A paint spray masking device for automobile wheel and tire assemblies, comprising a split band adapted to be applied to the periphery of the rim of an automobile wheel to project axially of the wheel for protecting the tire or the rim from paint being sprayed on the other of said members.

2. A paint spray masking device for automobile wheel and tire assemblies, comprising a split band adapted to be applied to the periphery of the rim of an automobile wheel to project axially of the wheel for protecting the tire or the rim from paint being sprayed on the other of said members, and means for connecting the ends of the split band to prevent separation of the band from the wheel rim.

3. A paint spray masking device for automobile wheel and tire assemblies, comprising a split band adapted to be applied to the periphery of the rim of an automobile wheel to project axially of the wheel for protecting the tire or the rim from paint being sprayed on the other of said members, said band having a radially inwardly bent flange at one edge to be engaged between the inner surface of a wheel rim and a tire mounted on the rim.

4. A paint spray masking device for automobile wheel and tire assemblies, comprising a split band adapted to be applied to the periphery of the rim of an automobile wheel to project axially of the wheel for protecting the tire or the rim from paint being sprayed on the other of said members, said band having a radially inwardly bent flange at one edge to be engaged between the inner surface of a wheel rim and a tire mounted on the rim, and a reinforcing bead formed on the other edge of the band.

5. A paint spray masking device for automobile wheel and tire assemblies, comprising a split band adapted to be applied to the periphery of the rim of an automobile wheel to project axially of the wheel for protecting the tire or the rim from paint being sprayed on the other of said members, and means for clamping together the ends of the band in overlapped relation.

6. A paint spray masking device for automobile wheel and tire assemblies, comprising a split band adapted to be applied to the periphery of the rim of an automobile wheel to project axially of the wheel for protecting the tire or the rim from paint being sprayed on the other of said members, and means for placing the band under circumferential compression to prevent separation of the band from a wheel rim.

7. A paint spray masking device for automobile wheel and tire assemblies, comprising a split band adapted to be applied to the periphery of the rim of an automobile wheel to project axially of the wheel for protecting the tire or the rim from paint being sprayed on the other of said members, said band having a radially inwardly bent flange at one edge to be engaged between the inner surface of a wheel rim and a tire mounted on the rim, a reinforcing bead formed on the other edge of the band, and means for clamping together the ends of the band in overlapped relation.

8. A paint spray masking device for automobile wheel and tire assemblies, comprising a split band adapted to be applied to the periphery of the rim of an automobile wheel to project axially of the wheel for protecting the tire or the rim from paint being sprayed on the other of said members, said band having a radially inwardly bent flange at one edge to be engaged between the inner surface of a wheel rim and a tire mounted on the rim, a reinforcing bead formed on the other edge of the band, and means for placing the band under circumferential compression to prevent separation of the band from the wheel rim.

ELBERT V. GUNN.